G. W. WOOLSEY.
FILTER.
No. 188,274. Patented March 13, 1877.
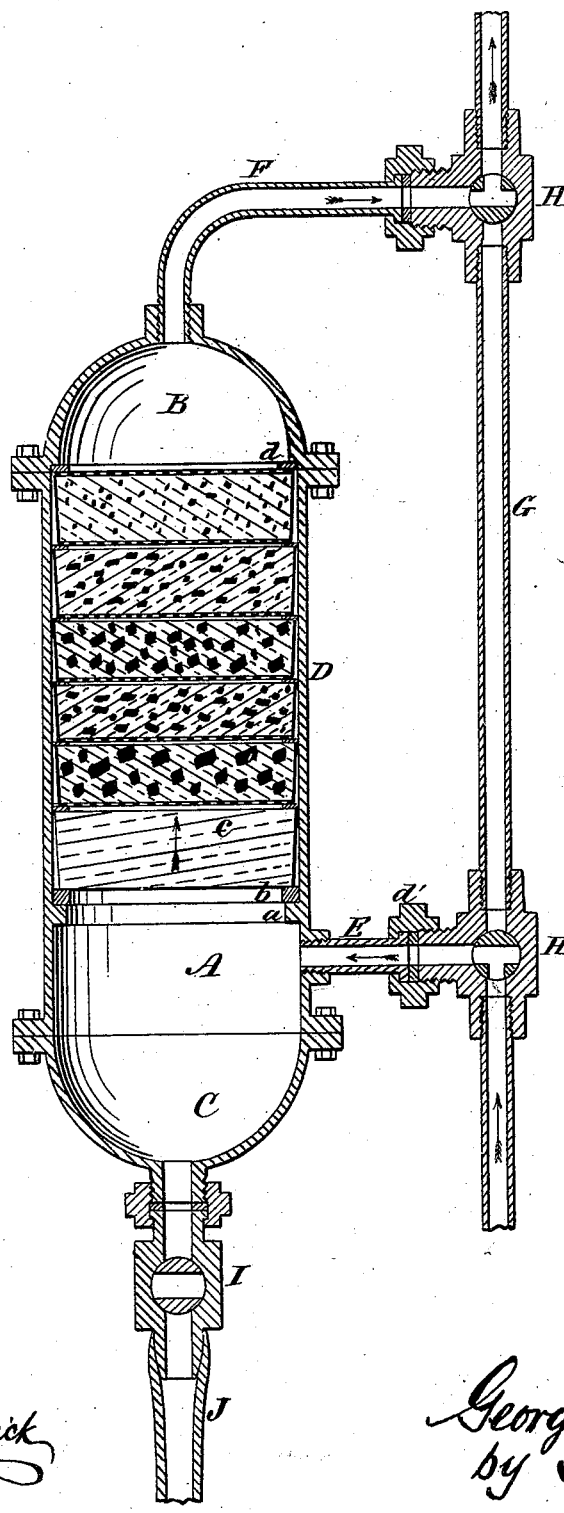
Attest
Evell A. Dick
D. P. Howl
Inventor:
George W. Woolsey
by A Pollok
his atty.

UNITED STATES PATENT OFFICE.

GEORGE W. WOOLSEY, OF TOLEDO, OHIO.

IMPROVEMENT IN FILTERS.

Specification forming part of Letters Patent No. 188,274, dated March 13, 1877; application filed January 24, 1877.

*To all whom it may concern:*

Be it known that I, GEORGE W. WOOLSEY, of Toledo, Ohio, have invented certain new and useful Improvements in Filters, of which the following is a specification:

My invention relates to filters designed to be used with water-works, or other means of furnishing a supply of water under pressure, with a view to removing from the water organic and other impurities, which would otherwise render it unsuitable for domestic use. The filter is designed to be connected with the water-supply pipe—the service-pipe of a house, for instance—in such manner, that the water may be compelled to pass through the filter before reaching the point where it discharges.

The conditions requisite to a practically successful use of the filter in this connection are, first, that it should be susceptible of being readily applied to the service-pipe; second, that the water may pass through the filter in either direction, or, if need be, through the service-pipe alone, without entering the filter. With regard to the latter condition, it may be noted that it becomes necessary for the water to pass through the service-pipe alone whenever the filter requires to be repaired or opened; that the water must pass from the service-pipe into and up through the filter, and thence to the point of discharge, in order to be freed from impurities; and that, on the other hand, it is very desirable to send at times the water through the filter in a direction opposite to that last referred to, in order to flush and clean the filter, and prevent the clogging of the filtering media or surfaces.

The apparatus in which my invention is comprised fulfills these conditions. The filter proper is also so constructed as to prevent the filtering media from packing, and to allow ready access to be had to the interior of the filter for the purpose of reaching those surfaces most likely to become clogged by impurities.

The nature of my invention and the manner in which the same is or may be carried into effect will be understood by reference to the accompanying drawing, which represents in vertical central section an apparatus embodying my improvements. I shall describe first the preferred construction of the filter proper, and then the devices which connect it with service-pipe. The filter, in this instance, consists of a metal cylinder, A, to which are fastened top and bottom caps B C, held in position by bolts passing through flanges on the caps and cylinder. In the interior of the cylinder is an annular ledge or shelf, $a$, upon which is placed first a rubber gasket, $b$, and then a porous stone, $c$. Above the stone is placed another gasket, on which rests a shallow metal pan, D, provided with a perforated bottom. Upon this pan is placed a second gasket and pan, and so on until the cylinder is filled. By placing upon the upper pan the top cap B, (which is provided with an internal flange, $d$, that bears on the pan,) and tightening the bolts, all the pans are tightly packed together.

This arrangement of the pans and gaskets prevents both the cutting of channels or formation of a water-way, and also the undue packing of the filtering material—such as sand, gravel, and charcoal—with which the pans are to be filled. That portion of the cylinder below the stone diaphragm acts as a reservoir, in which the heavier portions of the impurites settle, thus relieving the stone as much as possible from impurities.

The inlet-pipe E enters the side of the filter below the stone diaphragm. The outlet-pipe F leaves the top of the filter. Both pipes communicate with the main service-pipe G, as shown, and are joined to the filter by union-couplings $d'$, which permit the filter to be detached whenever it is desired. At the junction of the inlet and outlet pipes with the main service-pipe are two three-way cocks, H. These are the cocks by which the water may be passed in either direction through the filter, or directly through the service-pipe. In the position in which they are represented in the drawing, the water, moving in the direction of the arrow, passes up through the filter, and is purified by the time it reaches the outlet-pipe.

It is manifest, however, that by properly turning the cocks, the water may be caused to pass directly up through the service-pipe without communicating with the filter, thus allowing the filter to be detached from the service-pipe, if desired, or the water can be allowed to pass up the service-pipe to the second or upper three-way cock, which will direct it into the upper part of the filter, whence it will pass down through the filtering media to the settling-reservoir, at the bottom of which is an ordinary bib-cock, I, connected by lead pipe J with the sewer. The pipe J is joined by a union-coupling to the filter. The purpose of this arrangement is to flush and wash out the filter. Ordinarily, however, in cleaning the filter, it is simply necessary to open the flush-cock I, when the pressure of water from the main will serve to wash off the bottom of the stone diaphragm, and force out all impurities in the settling-reservoir. If, after long-continued use, the bottom of the stone becomes so clogged as to impede the passage of the water, the lower cap of the filter can be taken off, and the bottom of the stone scrubbed. To guard against excessive pressure of water, a pressure-valve may be placed in the inlet-pipe to regulate the pressure of the incoming water.

Having now described my invention, what I claim, and desire to secure by Letters Patent, is—

1. The combination, substantially as set forth, of the main or service pipe, the filter, the flush-cock, the inlet and outlet pipes, and the two three-way cocks.

2. The combination, with the body of the filter, of the series of superposed filtering-pans and interposed packing-gaskets, and the cap by which said pans and gaskets are held and packed tightly together, substantially as set forth.

3. The filter, consisting of a metal cylinder closed by top and bottom caps, and provided internally with a porous stone diaphragm and superposed series of filtering-pans and intermediate gaskets held and pressed together by the upper cap of the cylinder, as set forth.

In testimony that I claim the foregoing as my own I affix my signature in presence of two witnesses.

GEO. WALKER WOOLSEY.

Witnesses:
   WILLIAM C. CHAPMAN,
   GEO. W. HOLLENBECK.